AUTOMATIC SCANNING CONTROL

Filed Dec. 6, 1957 3 Sheets-Sheet 1

INVENTOR.
JOSEPH J. ZIMMERMANN

BY

Andrus, Sceales & Starke

ATTORNEYS

July 31, 1962 J. J. ZIMMERMANN 3,047,663

AUTOMATIC SCANNING CONTROL

Filed Dec. 6, 1957 3 Sheets-Sheet 2

INVENTOR.
JOSEPH J. ZIMMERMANN
BY
Andrus, Sceales + Starke
ATTORNEYS

INVENTOR.
JOSEPH J. ZIMMERMANN
BY
Andrus, Sceales & Starke
ATTORNEYS

3,047,663
AUTOMATIC SCANNING CONTROL

Joseph J. Zimmermann, Milwaukee, Wis., assignor to Electronic Secretary Industries, Inc., Waukesha, Wis., a corporation of Wisconsin Filed Dec. 6, 1957, Ser. No. 701,246
22 Claims. (Cl. 179—6)

This invention relates to automatic scanning control and particularly to an interlock means to insure correct scanning of a record in a phonographic or other recording device having a simultaneously relatively moving record and transducer.

Magnetic disc type records and associated magnetic tone arms have recently been used as an improved replacement for a grooved record and needle-type pickup in a phonograph or the like. These magnetic records are generally similar in shape to the conventional grooved record and the magnetic tone arm is pivotally mounted adjacent the record support to permit radial scanning of the record. A magnetic transducer is carried by the tone arm and disposed immediately adjacent the record to either record a message on the record or to translate a previously recorded message. However, even though the magnetic transducer may rest on the record, it does not actually cut into the record and therefore mechanical tracking mechanism to move the tone arm and transducer across the record is not established as in the conventional phonographic apparatus. Therefore, auxiliary tracking equipment is required.

Whenever a magnetic record of the disc variety is to be played back, it is essential that the transducer be reset to the exact starting point of the message track of the record. This is true because the message on the record is magnetically carried as a magnetized spiral line or path. If the tone arm is not reset to dispose the magnetic transducer head immediately adjacent the starting point of the spiral path, the head does not follow the original path but rather some other spiral track. Thus, inertia and tolerances in the apparatus may cause the tone arm to be reset to a different starting point on the record after each cycle of operation and a subsequent reproduction cannot be made until the magnetic transducer is aligned with the precise starting point on the record.

It has been conventional to employ a separate mechanical spirally grooved track disposed adjacent the tone arm to coordinate the movement of the record and the tone arm. A tracking stylus is secured to the tone arm and engages the track whereby the movement of the track pivots the tone arm over the record in much the same manner as in the conventional, grooved record.

A mechanical interlock or tracking system is generally relatively complex and expensive and is also subject to wear. Further, in the mechanical tracking systems employing tracking discs the stylus which passes through the grooves of the tracking disc transmits any irregularity of the tracking disc surface to the magnetic head assembly. This results in continual changes in the magnetic coupling between the record and the head and consequently in the volume and distortion of the reproduced signal.

It has also been suggested to employ a spiral cam driving a depending follower member of the tone arm in synchronism with the record to establish correct scanning. The spiral cam is positively driven at all times to maintain the tone arm positioned with respect to the record in a single predetermined manner. The positive drive although normally providing satisfactory results does not account for slippage and the like within the mechanism which may result in slight error in tracking of the sound track during reproducing. Further, and more important for certain applications the positive drive connection prevents use of records of different lengths unless a separate spiral cam is provided for each record. If a single sized record is used regardless of the length of the message, for all but maximum messages, the unused portion of the cam cycle is necessarily completed before the apparatus resets. The latter is wasteful of time and energy and is particularly undesirable in automatic telephone answering apparatus and similar applications.

Automatic telephone answering apparatus is associated with a subscriber's telephone circuit and employs phonographic apparatus to automatically transmit a message to a calling party in response to receipt of an incoming ringing signal. Unless an incoming message is to be recorded, the apparatus is desirably automatically disconnected and reset to standby immediately incident to the end of the outgoing message.

In some automatic answering apparatus which permit recording of incoming messages, the resetting of the outgoing message phonograph is employed to control switching to recording. In such apparatus, the outgoing message apparatus must reset immediately incident to the end of the outgoing message.

The present invention provides a transducer movement which is electrically interlocked with the position of the record support such that the transducer is held in a starting position until the exact proper point on the record is aligned with the transducer. The transducer is mounted and connected in such a manner that it may be held or moved independently of the record support movement without damaging any of the connecting or coupling mechanism or without destroying the operation of the circuit and therefore may be positively held until the exact starting point is aligned therewith.

In another aspect of the invention, an automatic disconnect switch is provided which is automatically set during the recording cycle and which initiates means to reset the apparatus to standby at the end of a subsequent reproduction of the recording. The automatic disconnect setting is permissible because of the essentially free floating tone arm which may be moved at any time back to the starting position. This feature is very important in automatic telephone answering equipment and the like where the length of the outgoing message is varied from time to time and the reproducing cycle is preferably controlled in accordance with the length of the message.

The present invention provides a simple, reliable and durable magnetic transducer control and insures proper synchronism between the starting of a magnetic message track and the transducer to obtain proper reproduction of a record. The present invention is particularly adapted for use in telephone answering equipment because of the simple method provided for resetting of the device to its initial position after a reproduction of a previously recorded message and the ease of changing from one outgoing message to another.

The drawings furnished herewith illustrate the best modes presently contemplated by the inventor for carrying out the subject matter of the present invention.

Figure 1:
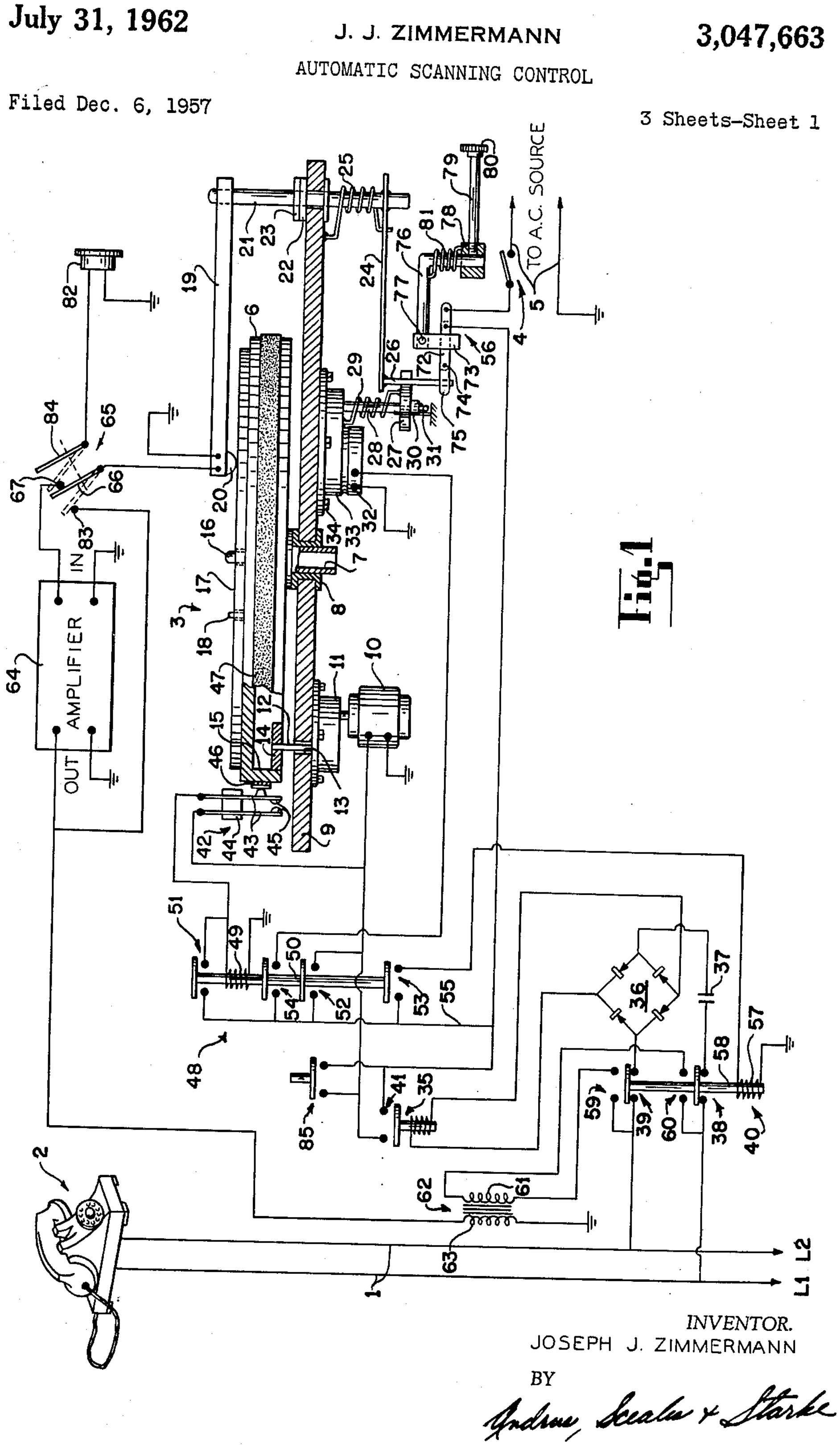
FIGURE 1 is a schematic wiring diagram with a magnetic phonograph and certain other components shown more or less diagramatically.

Referring to the drawing and particularly to FIG. 1 thereof, a set of telephone lines 1 is shown connected to a conventional telephone 2 of the cradle type. A phonograph 3 is also connected to the telephone lines 1 to automatically answer an incoming call to the subscriber's telephone 2 whenever the subscriber is absent or cannot for some other reason personally answer the incoming call. A main control switch 4 is connected in one line of a set of power lines 5 which is connected to a source of current, not shown, to supply operating current to the phonograph 3 and the other components of the automatic answering mechanism.

One of the power lines 5 is shown grounded for simplification. The various electrical components which are connected to the power lines are shown having one side connected to the hot power line 5, that is, the ungrounded line, and the other side connected by a conventional symbol to ground to complete the return path.

Figure 2:
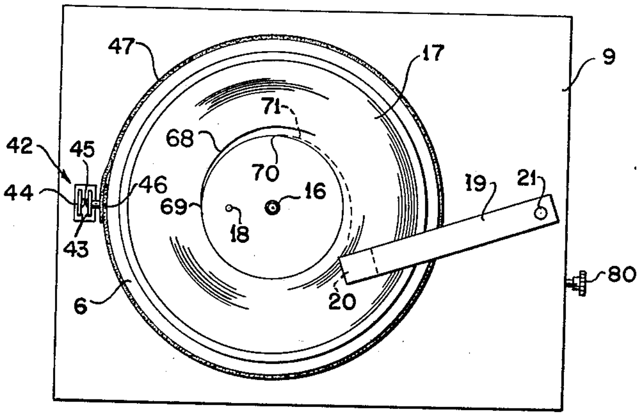
FIG. 2 is a top view of the phonograph shown in FIG. 1.

Referring to FIGS. 1 and 2, the illustrated phonograph 3 includes a rotatable turntable 6 of an inverted cup-shaped configuration. The turntable 6 is centrally supported by a center pivot shaft 7 which extends downwardly and is journaled in a combined radial and thrust bearing 8 to allow rotation of the turntable. The bearing 8 is rigidly secured within an opening in a turntable platform 9 to support the turntable 6 above the platform 9. A turntable drive motor 10 is supported beneath the platform 9 by a gear mechanism 11 which is bolted or otherwise attached to the undersurface of the platform. The output shaft 12 of gear mechanism 11 extends upwardly through an aperture 13 in platform 9 and carries a drive roll 14 at its upper end. The drive roll 14 frictionally engages the inner peripheral surface 15 of the depending flange or wall of the turntable 6 and rotates the turntable about the turntable pivot shaft 7 whenever the motor 10 is energized. A centering pin 16 extends upwardly from the center of the turntable 6 to receive and radially locate a centrally apertured magnetic record disc 17 on the upper surface of the turntable. A small pin 18 extends vertically upwardly from the upper surface of the turntable 6 in slightly radially spaced relation to the centering pin 16. The magnetic record 17 is provided with a correspondingly spaced aperture to receive pin 18 so that the record 17 may be placed upon the turntable in only one correct position.

A tone arm 19 is pivotally supported adjacent the outer periphery of the platform 9 and extends horizontally over the record 17. A suitable magnetic transducer 20 is secured to the free or outer end of the tone arm 19 and includes suitable electromagnetic coils or the like, not shown, to magnetically record or pick up a signal on the record 17. The transducer 20 is of any variety adapted to establish a magnetic signal to magnetize the record 17 and thereby place a signal on the record or adapted to establish an electrical signal corresponding to a previously magnetized portion of the record.

If desired the magnetic transducer 20 may also carry an erase coil operable during the recording cycle to erase any previously recorded message, in a conventional manner.

The tone arm 19 is mounted at its outer end for radial movement of the transducer 20 over the record 17. The arm 19 is rigidly secured to the upper end of a rotatable tone arm shaft 21 which extends vertically downwardly through a bearing 22 in the turntable platform 9. The bearing 22 is a combined radial and thrust bearing and a collar 23 is provided on the shaft 21 and engages the upper surface of the bearing to rotatably support the tone arm shaft 21.

The follower arm 24 is secured to the lower end of the shaft 21 as by welding or the like and is positioned and held in alignment with the tone arm 19. A light coil spring 25 encircles the tone arm shaft 21 beneath the platform 9 and is secured at opposite ends to the platform 9 and the follower arm 24, respectively. The coil spring 25 is wound to bias the follower arm 24 and therefore the tone arm 19 to an initial starting position.

A depending pin 26 is secured to the outer end of the follower arm 24 and engages the surface of a spiral cam 27 under the action of the coil spring 25. The cam 27 is adapted to move the pin 26 and thereby pivot the arm 24 and the connected tone arm 19 against the bias of spring 25.

Figure 3:
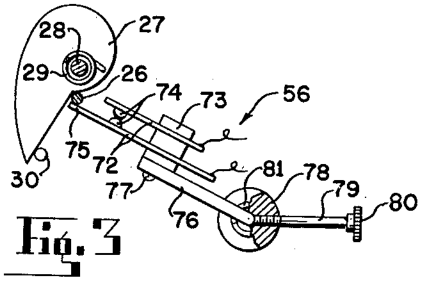
FIG. 3 is an enlarged top view of drive and control elements shown in FIG. 1.
Figure 6:
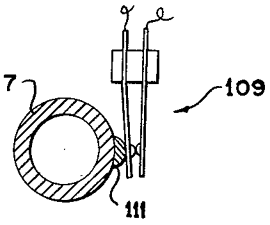
FIG. 6 is an enlarged fragmentary view of a switch and switch actuator employed in the apparatus shown in FIG. 4.

Referring to FIG. 3, the illustrated cam 27 is a plate-like member which is centrally secured to a rotatable shaft 28 and is provided with a spirally contoured peripheral edge such that rotation of the cam moves the pin at a uniform speed in an arc around the center of shaft 21, pivoting the shaft 21 and tone arm 19 against the bias of spring 25. A constant force spring 29 encircles the shaft 28 and biases the cam 27 to an initial starting position engaging a stationary stop 30. The energy in the spring 25 also increases as the tone arm 19 moves from its original position and returns the tone arm 19 to initial starting position.

As the tone arm 19 pivots about the centerline of shaft 21, the transducer 20 moves in a slight arc across the record to scan the magnetic record disc 17 which is simultaneously rotated in synchronism with the movement of the arm 19. The peripheral cam surface of the cam 27 is so proportioned that less than a complete revolution of the cam moves the transducer 20 to the outer edge of the largest record 17 which the apparatus is adapted to receive. The apparatus is automatically disconnected and reset to standby at the end of a reproducing cycle as subsequently described.

The cam 27 is rigidly secured to the lower end of the cam shaft 28 by a nut 31. The lower end of the cam shaft 28 is smaller in diameter than the main portion to establish a shoulder on the shaft 28 against which the cam 27 is clamped by the nut 31.

The shaft 28 is connected for operation to a small motor 32 through a suitable speed reducing gear mechanism 33. The gear mechanism 33 is secured to the underside of the platform 9 as by bolts 34 to support the motor 32, the shaft 28 and cam 27.

The motor 32 is preferably a small synchronous motor or similar prime mover such that the cam 27 may be turned or rotated in either direction without any appreciable load thereon. When the synchronous motor 32 is energized, it drives the cam 27 to effect relative movement of the transducer 20 and the record 17 to magnetically record or reproduce a message upon the record 17.

The present apparatus is particularly adapted to automatically answer a telephone and the operating circuit therefor is shown so connected in FIG. 1, as now described.

Referring to FIG. 1, a ringing relay 35 is connected across the output of a bank of rectifiers 36 which is connected across telephone lines 1 in series with a blocking condenser 37. The rectifier bank 36 changes an alternating ringing current to a direct current suitable for operation of the relay 35 and may be of any suitable variety; a full-wave bridge connection being shown for purposes of illustration. The blocking condenser 37 blocks the direct current normally circulating in the telephone lines from passing through the rectifier bank 36 and the relay 35.

The rectifier bank 36 is connected to the telephone lines 1 through normally closed contacts 38 and 39 which are disposed respectively one each in each of the input lines to the rectifier bank. The latter contacts constitute a part of a line loading relay 40, the operation of which is more fully developed in the later description of the apparatus.

The D.C. ringing relay 35 includes a set of normally open contacts 41 which are connected in series with the turntable motor 10 to the power supply line 5. The opposite side of the turntable motor 10 is connected to ground such that when relay contacts 41 close, power is provided to the motor 10 from the lines 5. Consequently, each time a pulse of the ringing signal is received, the contacts 41 close to operate the motor 10 and thereby rotate the turntable 6.

A synchronizing and latching switch 42 is mounted adjacent the periphery of the turntable 6 to start a cycle of operation if a ringing signal is received when switch 42 is closed. The switch 42 includes a pair of flexible contact arms 43 extending through and secured to an insulating mounting support 44. The arms 43 carry opposed contacts 45 at one adjacent end and are biased to hold the contact buttons disengaged. The switch 42 is mounted with the arms adjacent the turntable 6 and closed once each revolution of the turntable by a small protrusion 46 formed on the periphery of the turntable 6 by overlapping the ends of an encircling strap 47 which is secured to the outer periphery of the turntable 6. The protrusion 46 momentarily engages one of the flexible arms 43 which is located in the path of the protrusion 46 to move the same toward the other arm 43 and engage the contacts 45.

A latch relay 48 includes an actuating winding 49 connected to the supply lines 5 in series with the relay contacts 41 of the ringing relay 35 and the contacts 45 of switch 42. Therefore, if the switch contacts 45 and the ringing relay contacts 41 are simultaneously closed, the relay winding 49 is energized and moves an electromagnetically associated armature 50 which controls four sets of normally open contacts 51, 52, 53 and 54. The contacts have a common side connected by a line 55 to the power line 5 in series with an automatic disconnect switch 56 and the manual control switch 4.

The first set of relay contacts 51 are latching contacts and are connected in a parallel circuit with the series connected relay contacts 41 of relay 35 and contacts 45 of switch 42. The closed contacts 51 complete the circuit to the relay winding 49 from the power lines 5 independently of the contacts 41 and switch 42 after the initial energization of winding 49. Therefore, winding 49 remains energized until either the automatic disconnect switch 56 or the manual control switch 4 opens.

The second set of contacts 52 are connected in parallel with the contacts 41 and in series with the drive motor 10 to complete the circuit to the motor 10 from the power lines 5 independently of the contacts 41. After contacts 52 close, the motor 10 continues to drive the turntable 6 until such time as either the disconnect switch 56 or the manual control switch 4 opens.

The third set of contacts 53 are serially connected with a relay winding 57 of the line loading relay 40 to the power supply lines 5 to complete the energization circuit for winding 57. When relay contacts 53 close and effect energization of relay winding 57, an associated armature 58 of relay 40 moves to open the normally closed relay contacts 38 and 39 and thereby disconnect the ringing relay circuit from the telephone lines 1. The movement of the armature 58 simultaneously closes two other sets of contacts 59 and 60 which are connected one each in each side of one winding 61 of a line coupling transformer 62. The completed connection of the winding 61 across the telephone lines 1 loads the telephone lines and simulates lifting of the hand set of the telephone 2 and thereby permits transmission of signals over the telephone lines.

A second winding 63 of the transformer 62 is connected to the output terminals of an amplifier 64 having its input terminals connected to the transducer 20 through a double-pole, double-throw switch 65 which is manually movable to a recording position and a reproducing position. The switch 65 includes one common pole 66 which is connected to the transducer 20 and adapted to engage an input contact 67 to the amplifier 64 with the switch in the reproducing position to establish a communication circuit from the record 17 to the telephone lines 1 via the relay contacts 59 and 60 of latch relay 40.

A fourth contact 54 of the latch relay 48 controls the movement of tone arm 19 and is serially connected with the synchronous drive motor 32 to the supply lines 5 through the disconnect switch 56 and the control switch 4. Consequently, when contacts 54 close, the motor 32 is energized and rotates the cam 27 through the gear mechanism 33. The movement of the cam 27 is transmitted to the tone arm 19 and attached transducer 20 which then scans the record 17. The transducer 20 magnetically picks up a message recorded on the record 17 and transmits the signal via the amplifier 64 and the coupling transformer 62 to the telephone lines 1.

As previously described, it is necessary that the transducer 20 begins scanning at the precise point on the record 17 corresponding to the starting point during the recording cycle. This is true because, referring to FIG. 2, a magnetic spiral track 68, shown by a solid line, is established from a starting point 69 during the recording period. If the transducer 20 starts at any other point on the record 17 than point 69, for example, a point 70, the transducer 20 follows a new spiral path, shown by phantom line 71. It is seen that the message is not translated if transducer 20 starts at point 70.

The present invention insures that this desired starting relationship is maintained because the release of the tone arm by the switch 42 is directly related to the relative position of the turntable 6 and the record 17 carried thereby. This position is so established that the transducer 20 is precisely aligned with the starting point 69 of the message track 68 when the motor 32 is energized. The message is translated by the transducer 20 and transmitted to the calling party. At the end of the message, the disconnect switch 56 is automatically actuated and the apparatus returns to standby.

The automatic disconnect switch 56 is similar to the switch 42 and comprises a pair of flexible arms 72 extending through an insulating mounting block 73 and carrying opposed contacts 74. The flexible arms 72 are constructed to normally bias the contacts 74 to an engaged position. One of the contact arms 72 extends beyond the other as at 75 and into the path circumscribed by the pin 26 during the movement of the cam 27. The opposite ends of the contact arms 72 are serially connected in circuit in the hot power line 5 with the various components, as previously described.

Referring particularly to FIGS. 1 and 3, the mounting support 73 of switch 56 is secured to the outer end of a horizontally disposed leg of an L-shaped shaft 76 by a bolt 77 or the like. A vertical leg of the L-shaped shaft 76 is journaled in a stationary bearing 78. A set screw 79 threads through an opening in the wall of bearing 78 into engagement with the shaft 76 and releasably locks the shaft 76 in a predetermined position. The outer end of the set screw 79 is provided with a knurled knob 80 to allow manual locking and releasing of the L-shaped arm 76 in position. A coil spring 81 encircles the vertical portion of the shaft 76 and is secured at one end to the arm 76 and at the opposite end to the bearing 78. The spring 81 is tensioned to bias the switch 56 toward the pin 26.

During the recording cycle, the set screw 79 is withdrawn to release the shaft 76. The pin 26 engages the extended contact spring portion 75 and moves the disconnect switch 56 in proportion to the movement of the tone arm 19. At the end of the recording cycle, the knob 80 is turned to thread the set screw 79 into locking engagement with the vertical portion of the shaft 76. The contact arm 72, carrying extending leaf spring portion 75 which is engaged by pin 26, is slightly stiffer than the bias spring 81 such that with the shaft 76 released to freely rotate, the pin 26 does not move the contact arm 72 which has extension 75 relative to the opposed contact arm 72 to effect opening of the contacts 74. However, when the shaft 76 is locked in position by the set screw 79, the movement of the pin 26 into engagement with the contact arm portion 75 actuates the switch 56 to open the contacts 74.

During the reproducing cycle, the disconnect switch 56 which has been previously locked in a position corresponding to the message ending position of the tone arm 19 is automatically actuated to open the power circuit to the apparatus at the end of the message on the record.

To record the outgoing message upon the record 17, switch 65 is adapted to connect a microphone 82 to the transducer 20 via the amplifier 64, as shown by the phantom line position of switch 65 in FIG. 1. The switch 65 includes a contact 83 connected to the output of the amplifier 64 and also a movable pole 84 connected to the microphone 82. When the switch 65 is moved to a record position, pole 84 engages the amplifier input contact 67 and the transducer pole 66 engages the amplifier output contact 83. Consequently, a message spoken into the microphone 82 establishes an electrical signal which passes through the pole 84 and contact 67, then through the amplifier 64 where it is suitably amplified for recording, to the output contacts 83 and common pole 66 and then to the transducer 20. The return path being by way of ground, as shown.

A manually operable push button switch 85 is connected across the ringing relay contacts 41 to connect the drive motor 10 and the latching relay 48 to the power lines 5 independently of the ringing circuit and to initiate the previously described latch.

To stop the phonograph 3 at the end of a recording cycle, the manual switch 4 is opened or the set screw 79 tightened into locking engagement with the L-shaped arm 76 to lock the disconnect switch 56 in position, which is then automatically operated.

The operation of the telephone answering apparatus illustrated in FIGS. 1–3 is described as follows.

Assume the telephone subscriber is absent from his office or cannot for some other reason personally answer the telephone 2 and has manually closed the switch 4 to operatively connect the telephone answering apparatus to the telephone line 1. Assume further, that a ringing signal is applied to the telephone line 1 from a distant telephone station.

The ringing current from the telephone line 1 is passed by the condenser 37 and rectified by the bank of rectifiers 36 to energize the relay 35 which then closes its contacts 41. The relay contacts 41 close and the energizing circuit to the phonograph motor 10 is completed. The contacts 41 are held closed as long as ringing current is present. When the ringing current ceases the contacts open and break the circuit to the motor 10.

The turntable 6 is driven by operation of motor 10 through the gear mechanism 11 and friction gear 14 each time a ringing signal is received. If the ringing current is present at the same time the turntable protrusion 46 engages the adjacent flexible contact arm 43, the corresponding contacts 41 and 45 are closed and the winding 49 is energized.

When the winding 49 is energized it closes the normally open contacts 51, 52, 53 and 54.

As previously described, contacts 51 latch the winding 49 in circuit.

The contacts 52 connect the motor 10 to the power supply independently of the ringing contacts 41.

The relay contacts 54 supply power to the tone arm drive motor 32.

The contacts 53 connect power to the relay winding 57 of the line loading relay 40. The line loading relay 40 then opens the ringing relay contacts 38 and 39 and disconnects the ringing relay 35 from the telephone lines 1 and closes the contacts 59 and 60 to connect the transformer 62 across the telephone lines 1.

In the automatic telephone answering position, the switch 65 is thrown to the full line position to engage the arm 66 with contact 67. Therefore, any message picked up by the transducer 20 is transmitted by the amplifier 64 and the transformer 62 to the telephone lines 1 and thus to the calling subscriber.

The apparatus is now latched in circuit and the cam 27 is being driven by the motor 32. The cam 27 moves the pin 26 and thereby pivots the tone arm 19. As the tone arm pivots, the transducer 20 slowly and constantly moves across and scans the record 17. The message track is followed by the transducer 20 and the message thereon is picked up and transmitted to the calling party.

The transducer 20 starts at the exact starting point 69 of the message due to the inter-action of the switch 42 and the positioning of the record 17 on the turntable 6 as determined by the upstanding pin 18.

After the message has been transmitted the spiral cam 27 has moved the pin 26 into engagement with the contact arm portion 75 of the automatic disconnect switch 56 which was positioned during the recording cycle, as previously described. The movement of the cam beyond the period necessary to effect a complete reproduction of the message causes the pin to tend to travel past the contact arm 75. The pin 26 therefore engages the contact portion 75 and moves it away from the opposite arm 72 and thereby effects the opening of contacts 74. When this occurs, the power supply line 5 is opened and the latch relay 48 is disconnected from the circuit.

The armature 50 of the latch relay 48 then reverts to its original position opening all of the associated contacts 51 through 54.

When contacts 51 open, the latching circuit to the relay 48 is opened and relay winding 49 cannot be again energized except through the contacts 45 of synchronizing switch 42.

Contacts 52 disconnect the power from the phonograph motor 10 and stop further movement thereof.

Contacts 54 open incident to the de-energization of relay 48 and disconnect the tone arm drive motor 32. The coil spring 29 is then released and returns the cam 27 to the initial starting position engaging stop pin 30. The coil spring 25 releases and returns the tone arm 19 to its initial position with the follower pin 26 disposed in engagement with the surface of cam 27 for a subsequent reproduction of the message or record 17.

When the contacts 53 open, the relay 40 is de-energized and the armature thereof reverts to its original position opening contacts 59 and 60 to disconnect the transformer 62 from the telephone line 1 and closing the contacts 38 and 39 to connect the ringing relay winding 35 across the telephone line. The apparatus is then in standby position to receive and answer a subsequent call.

When the calling subscriber returns to his office he may disconnect the apparatus and then once again personally answer the incoming telephone calls.

If the telephone subscriber wishes to record a new message on the apparatus, the switch 65 is manually moved to the record position with the common pole 66 engaging contact 83 and the microphone pole 84 engaging the contact 67. The switch button 85 is depressed and the operating circuit completed and latched into operation in the same manner as when an incoming ringing signal is received. The knurled knob 80 is turned to withdraw screw 79 from the shaft 76 which is then biased into engagement with the follower pin 26 by the coil spring 81. As the tone arm 19 traverses the record 17 and the telephone subscriber speaks into the microphone 82, the transducer 20 slowly scans the record and forms a spiral magnetic path on the record 17 with the message therein. When the subscriber finishes giving the message the tone shaft 76 is locked in position by manually turning the knob 80 to engage the setscrew 79 with the shaft 76 and the apparatus is shut down by opening the master switch 4.

It is noted that when the telephone subscriber locks the shaft 76 in position, the pin 26 opens the switch 56 and automatically stops the apparatus and returns it to standby position.

Referring to FIG. 4–7, a second embodiment of the invention is shown also connected for automatic telephone answering. Corresponding elements in the first and second embodiment of the illustrated invention are provided with corresponding numbers to simplify the explanation of the second embodiment.

Figure 4:
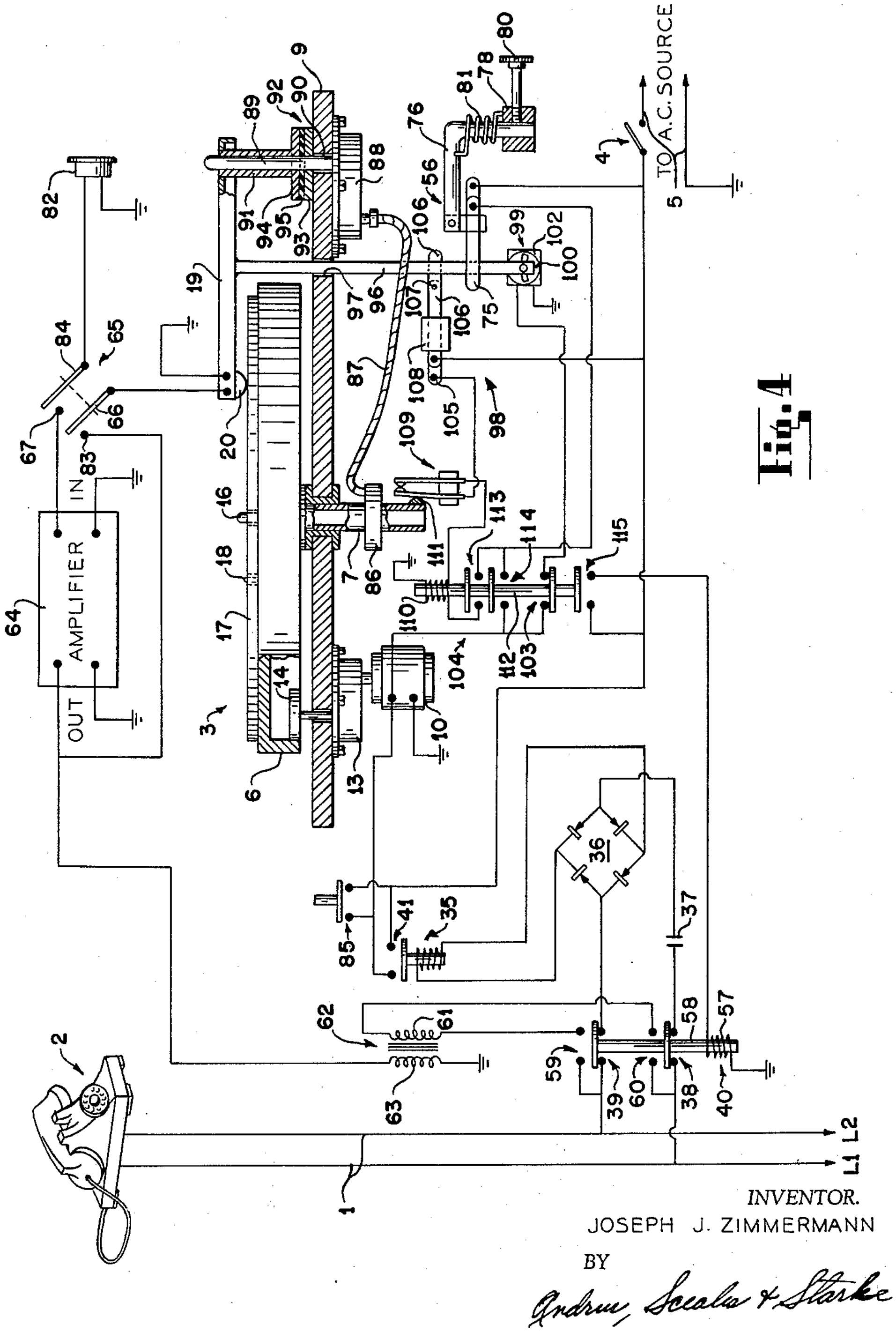
FIG. 4 is a schematic view similar to FIG. 1 of another embodiment of the invention.

Referring to FIG. 4, the tone arm 19 of the phonograph 3 in the present embodiment of the invention is driven by the turntable drive motor 10, in the following manner.

The turntable pivot support 7 is extended downwardly beneath platform 9 and carries a gear or other suitable coupling 86 having a flexible output shaft 87. The opposite end of the flexible shaft 87 is connected to the input of a suitable speed reducing gear mechanism 88 having an output shaft 89 extending upwardly through an aperture 90 in platform 9. The tone arm 19 is provided with a depending radial bearing member 91 journaled on the shaft 89 and operably connected to the shaft 89 through a friction type clutch 92 for pivoting of the arm.

The friction clutch 92 or other similar connection is provided to allow movement of the tone arm 19 independently of the drive mechanism. The illustrated friction clutch 92 includes a collar 93 on the output shaft 89 and a cooperating flange 94 on the lower end of the radial bearing member 91. A friction surface material 95 is disposed between the collar 93 and flange 94 and is secured to either one of the adjacent surfaces. The friction surface is such that during rotation of the shaft 89, a corresponding rotation is transmitted to the tone arm 19. However, if the tone arm 19 is restrained or forcibly moved, the friction clutch slips and prevents damage to the gear mechanism and/or the tone arm 19.

Figure 5:
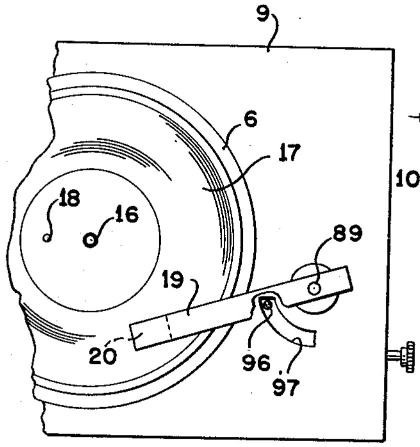
FIG. 5 is fragmentary plan view of the phonograph shown in FIG. 4.
Figure 7:
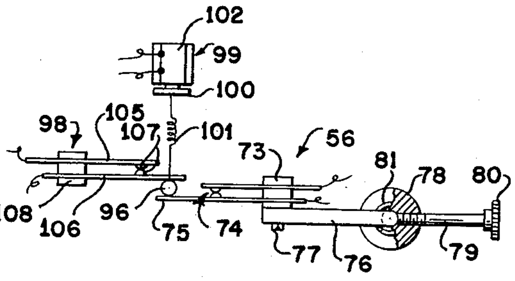
FIG. 7 is an enlarged fragmentary view of other control components shown in FIG. 4.

As shown in FIGS. 4, 5 and 7, a pin 96 is secured to the tone arm 19 and extends downwardly therefrom through an arcuate slot 97 formed in the turntable platform 9 adjacent the outer periphery of the turntable 6. The slot 97 is so positioned that the tone arm 19 may freely move during the recording and the reproducing cycles to scan the record 17 and control the circuit state of an interlock switch 98 and the disconnect switch 56.

An interlock solenoid 99 is mounted adjacent the lower end of pin 96 and includes an armature 100 secured to the pin by a stiff coil spring 101, as more clearly shown in FIG. 7. The spring 101 resiliently holds the tone arm 19 through the pin 96 in an initial starting position when the solenoid 99 is energized. The solenoid winding 102 is connected in series with relay contacts 103 of a latch relay 104 and in parallel with the drive motor 10. The contacts 103 are normally closed such that the solenoid winding 102 is energized to hold the tone arm 19 against movement during the initial energization of the turntable motor 10. The spring 101 has a sufficient internal force to prevent expansion by the driving force on the tone arm 19 and is employed as a damping or buffer means when the solenoid 99 pulls the tone arm 19 to an initial starting position.

The tone arm pin 96 in its initial position also engages the interlock switch 98 and holds it in a closed state as shown in FIG. 7.

The interlock switch 98 includes a pair of leaf springs 105 and 106 carrying opposed contact buttons 107 and secured in an insulating mounting block 108. The leaf spring 106 extends beyond spring 105 and into the path of pin 96 which in the original starting position holds the contact buttons 107 in engagement. The contact buttons 107 are connected in series, through the leaf springs, with a synchronizing switch 109 and an energizing winding 110 of the latch relay 104 to control the initial energization of the relay 104.

The synchronizing switch 109 is mounted adjacent the extended pivot support 7 and is otherwise structurally similar to the synchronizing switch 42 of the first embodiment. As more clearly shown in FIG. 6, the extended pivot support 7 is provided on its outer surface with an arcuate lever arm or protrusion 111 which momentarily engages the switch 109 once each revolution of the extended pivot support 7 which rotates in direct synchronism with the turntable 6. Thus, switch 109 is actuated in the same manner as the switch 42 in the first embodiment.

Although the first embodiment provides a more desirable switching arrangement because there is less danger of the turntable stopping with the actuating protrusion engaging the synchronizing switch, the second embodiment is shown as a possible alternative construction for purposes of illustration.

With the tone arm 19 held in the starting position by the solenoid 99, the switch 98 is held closed and when the contacts of the synchronizing switch 109 close, the relay winding 110 is energized. The winding 110 moves an associated armature 112 to open the solenoid control contacts 103 and to close a set of self-latching contacts 113, a set of motor latching contacts 114 and a set of line loading contacts 115.

When the contacts 103 open, the solenoid 99 is deenergized and allows the tone arm 19 to scan the record 17 with the solenoid armature 100 moving outwardly of the associated operating winding 102.

The relay contacts 113 are connected in series with the disconnect switch 56 and the relay winding 110, and in parallel with the series connected synchronizing switch 109 and the interlock switch 98. When contacts 113 close, they maintain the relay 104 energized independently of the switches 109 and 98.

The relay contacts 114 of relay 104 are connected in series with the motor 10 and in parallel with the relay ringing contacts 41 between the hot power line 5 and ground to maintain the motor 10 energized independently of the contact 41.

The relay contacts 115 of relay 104 are connected in series with the relay winding 57 of line loading relay 40 between the hot power line 5 and ground to complete the energizing circuit of the winding 57.

The operation of the embodiment of invention shown in FIGS. 4–7 is as follows:

Assume the manual switch 4 is closed to operatively connect the telephone answering apparatus to the telephone line circuit. The incoming ringing circuit is the same as in the first embodiment of the invention and the apparatus responds to incoming ringing signals to pulse the drive motor 10 in the same manner.

If a ringing signal is received with the protrusion 111 engaging the arms of the latch switch 109, the contacts thereof close and connect the latching relay winding 110 to the power supply line 5 in series with interlock switch 98 and the automatic disconnect switch 56. When the relay winding 110 is energized, the associated contacts 103 open and the associated contacts 113, 114 and 115 close. The closed contacts 113 latch the relay winding 110 to the power supply line 5 in series with the disconnect switch 56 to maintain energization of the winding until subsequent actuation of switch 56.

The contacts 114 latch the phonograph motor 10 to the power supply lines 5 in series with the disconnet switch 56 to maintain the operation of the motor until actuation of switch 56.

The contacts 115 complete the connection of the line loading relay winding 40 to the hot power line 5 through the disconnect switch 56. As in the first embodiment, the line loading relay winding 40 disconnects the ringing circuit from the telephone lines 1 and connects the coupling transformer 62 to the telephone lines 1 and maintains the connection until switch 56 is opened.

The apparatus is thereby in a condition to transmit a message from the record 17 via the amplifier 64 and coupling transformer 62 to the telephone lines 1 and thus to the calling subscriber.

It will be noted that the initial energizing circuit for the latch relay winding 110 includes the switch 98. This switch is a normally open switch which is held closed by the depending arm 96 with the tone arm 19 in the starting position. Therefore, the winding 110 of latch relay 104 cannot be energized unless the tone arm 19 is in its initial starting position.

The tone arm 19 is biased to and held in the initial starting position by the solenoid 99 which is energized whenever a ringing signal is received by the telephone answering apparatus.

The energization of the solenoid 99 is traced as follows: starting with the hot power line 5, through the relay ringing contacts 41, and then through the normally closed relay contacts 103 and the solenoid winding 102 to ground to complete the circuit. Therefore, each time a ringing signal is received the tone arm 19 is biased and held in an original starting position. When the relay 104 is energized and opens the contacts 103, the tone arm 19 is free to scan the record 17.

The release of the tone arm 19 is controlled not only by the position of the turntable 6 as determined by the switch 109 and the actuator 111 but is also controlled by the position of the tone arm itself through the switch 98. Therefore, the tone arm 19 and the attached transducer 20 is only released when the transducer 20 is in precise alignment with the starting point 69 of the spiral message track as shown in FIG. 2 which is described in connection with the first illustrated embodiment of the invention.

When starting point 69 and transducer 20 are aligned, the latch relay 104 is energized as described. The solenoid 99 is immediately de-energized because the contacts 103 of the latch relay open and as previously noted this releases the tone arm 19 for scanning movement.

The other circuits latch-in as previously described and cause simultaneous rotation of the turntable 6 and pivoting of the tone arm 19 to effect a scanning of the record 17 by the transducer 20. At the end of the outgoing message, the depending pin 96 has moved to engage the flexible contact arm portion 75 of the disconnect switch 56 which is now locked in position and the switch 56 opens. This opens the latch to the relay winding 110 and the relay reverts to its original position. The relay contacts 103 are then closed and the solenoid 99 is again energized and tends to pull the tone arm 19 through the connecting depending pin 96 back to its original starting position.

Although the coupling 86 and gear mechanism 88 provide resistance to this movement, the friction clutch 92 allows the tone arm 19 to freely move to its original position without placing any undue strain upon the operating components.

The contacts 115 open to de-energize relay 40 and actuate relay armature 58 and thereby disconnect the loading and transmitting transformer 62 from the telephone lines 1 and also connect the ringing circuit to the telephone lines 1 in the original standby position.

The contacts 114 open and disconnect the power lines 5 from the motor 10.

The apparatus of the second embodiment of the invention is then again in standby condition and ready to answer another call.

In the illustrated embodiments there is a variable time delay before the apparatus is latched into a cycle of operation, dependent upon the time for the latch switches 42 and 109, respectively, to be actuated by the movement of the turntable 6.

In certain telephone answering applications, an immediate latch to the telephone line system in response to the first or second ringing signal is desired. An instantaneous latch of the motor 10 or the like may be effected independently of latch switches 42 and 109 in response to an incoming ringing signal to latch-in a cycle of operation. A short time delay may be inserted in this quick latch to prevent initiating a cycle by spurious signals in the telephone line circuit in any suitable manner. For example, a thermistor may be connected in the input circuit. The subsequent scanning circuit control would function in a like manner as the previously described embodiments to insure synchronous movement of the tone arm assembly or other suitable transducer and the record member.

It will be noted that although only the second embodiment of the invention establishes an interlock dependent upon the return of the tone arm for an initial starting position, the first embodiment may also be constructed with a similar interlock to prevent any possibility of malfunctioning of the circuit.

The present invention has been described in connection with answering apparatus which only provides an outgoing message. However, the invention may be readily employed in apparatus which provides for recording of incoming messages.

Although shown particularly with respect to a magnetic disc type phonograph or the like, the apparatus may be employed with drums or any other mechanism wherein a spiral path is followed or traced between simultaneously moving members. The apparatus is also applicable to other than magnetic devices such as photographic devices and other similar devices where it is necessary to insure similar functioning of cooperating parts.

The previously recorded messages on a record may be readily removed by the use of a permanent bar magnet or the like which is held radially of the record and the record rotated through one revolution. In the alternative, any other suitable means, such as an erase coil in the transducer 20 may also be employed.

The present invention provides a simple and reliable system for insuring correct tracking between a relatively moving record and transducing means.

Various modes of carrying out the invention are contemplated as being within the scope of the following claims particularly pointing out and distinctly claiming the subject matter which is regarded as the invention.

I claim:

1. In a record device including a record member moving during actuation of the record device, a transducing means adapted to scan the record member and to trace a path on the record member, means to hold said transducing means inactive relative to said record member, and means under the control of the relative position of the movable record member and the transducing means to disenable said last named means and to release said transducing means incident to predetermined alignment of the transducer means and the record member in both the direction of movement of the transducer means and the record member to establish successive tracking of the record member by the transducer means.

2. In record apparatus having a magnetic transducer adapted to trace a non-linear message track on a magnetizable member, means to rotate the magnetizable member relative to said magnetic transducer, means to move said magnetic transducer across the magnetizable member to trace the message track, and interlock means operably associated with said last named means to maintain said last named means inoperative and being operatively associated with said magnetizable member to allow movement of the magnetizable member independently of movement of the transducer and to release said last named means in synchronism with alignment of said magnetic transducer and the starting point of said message track for subsequent simultaneous timed movement of the magnetizable member and the transducer.

3. In a recording device having a rotating record member and a laterally cyclic moving transducer scanning said record member from a predetermined starting position, electrically operable drive means for said transducer, interlock switch means in circuit with said drive means and biased to operably disconnect said drive means, means operably associated with said transducer and responsive to positioning of said transducer in said starting position to actuate said switch means to operably connect said drive means, and means adapted to establish a cycle of operation after actuation of said switch means.

4. In a photographic device having a magnetic disc record adapted to be rotated about a central axis and having a pivotally supported tone arm adapted to transport a magnetic transducer generally radially of the record, drive means to cyclically pivot said tone arm from a predetermined radial starting position, an electrical control circuit for said means including switch means biased to operably disenable the circuit from said drive means, actuating means for said switch means moving in synchronism with said tone arm, means to mount said switch means adjacent the corresponding starting position of said actuating means and responsive to engagement therewith to enable the circuit for said drive means, and latch means to allow a cycle of operation in response to actuation of said switch means.

5. In a phonographic device having a magnetic transducing means adapted to follow a spiral magnetized track on the surface of a magnetizable disc-like record member and a turntable means adapted to rotatably support the record member adjacent the magnetic means, means to rotate the turntable means, electrically controlled means to move said magnetic transducing means generally radially of the record member from an initial radial position, switch actuating means on an outer peripheral surface of the turntable means, and switch means operated by said switch actuating means and connected to control said electrically controlled means to establish the starting movement of said magnetic means in synchronism with alignment of the magnetic means and the starting point of said spiral message track whereby said magnetic means follows said spiral message track.

6. In phonographic apparatus having a magnetic means adapted to be selectively connected to record or to play back a message in the form of a spiral magnetized message track on the surface of a magnetizable disc-like record member and a turntable means adapted to rotatably support the record member adjacent the magnetic means, means to locate the record on the turntable in a predetermined relative position, means to actuate the turntable means, a synchronous motor operatively coupled with said magnetic means to move the magnetic means generally radially of the record member from a predetermined radial starting position, switch actuating means rotated in synchronism with the turntable, switch means operatively associated with said switch actuating means and connected in the operating circuit of said synchronous motor and momentarily closed during each revolution of the turntable means to start said synchronous motor, and latch means to maintain operation of said synchronous motor after initial starting thereof.

7. In phonographic apparatus having a magnetic means adapted to follow a magnetized spiral track on the surface of a rotatable magnetizable disc-like record member and a turntable means adapted to rotatably support the record member adjacent the magnetic means, means to actuate the turntable means, a tone arm assembly pivotally supported over said record member and having said magnetic means secured thereto, a spiral cam, motor means adapted to rotate said spiral cam, a cam follower secured to said tone arm assembly and biased into engagement with the cam, said cam steadily swinging said cam follower and the attached tone arm assembly to generally radially move the magnetic means across the surface of the record member and trace a spiral path on the record member, switch actuating means rotated in synchronism with said turntable means, and switch means mounted adjacent said switch actuating means, and momentarily operated once during each revolution of the turntable, a power circuit for said motor including said switch means to complete an energizing circuit to the motor once each revolution of the turntable, and latch means to maintain said power circuit after initial completion thereof by said switch means.

8. A photographic apparatus having a magnetic means adapted to follow a spiral track on the surface of a magnetizable disc-like record member and a turntable means adapted to rotatably support the record member adjacent the magnetic means, means to actuate the turntable means, a tone arm pivotally supported at one end outwardly of the periphery of the turntable for substantially radial movement across said record member extending over said turntable means and said record member, means to mount the magnetic means in the opposite end of the tone arm, means connected to bias the tone arm to a starting position with respect to the record member, a rotatable cam having a spiral peripheral surface, a cam follower rigidly connected to said tone arm and adapted to pivot in synchronism therewith, said cam follower engaging said spiral surface to pivot said tone arm and generally radially move the magnetic means across said record member, a motor adapted to rotate said cam in timed relation with the rotation of said record member, a power circuit for said motor, a normally open switch connected in said power circuit and disposed adjacent the periphery of the turntable, an arcuate protrusion on said turntable periphery adapted to close said switch once each revolution, and a latch switch means connected in parallel with said switch and operated thereby to maintain said power circuit incident to closing of the switch.

9. In a record device having a rotatable disc record supported on a turntable means and a transducer, a synchronizing switch means mounted adjacent the outer periphery of the turntable and controlling initial movement of the transducer, and a switch actuating means mounted on said turntable means and adapted to momentarily engage said switch means once each revolution of the turntable means to initaite movement of the transducer in accordance with a predetermined turntable means position.

10. In a magnetic disc record device having a turntable and a magnetic scanning device, a synchronizing switch mounted adjacent the outer periphery of the turntable and controlling starting movement of the scanning device, a switch actuator secured to the periphery of the turntable and having a small arcuate switch engaging portion to monentarily actuate said switch once each revolution of the turntable to start the movement of the scanning device in accordance with a predetermined turntable position.

11. In a magnetic disc recording device having a turntable and a magnetic scanning device, a synchronizing switch mounted adjacent the outer periphery of the turntable and controlling initial movement of the scanning device, and a strap encircling the periphery of the turntable and having its ends slightly overlapped to establish a small protrusion on the periphery of the turntable, said protrusion momentarily engaging said switch once each revolution of the turntable to initiate movement of the scanning device in accordance with a predetermined turntable position.

12. In a magnetic record phonographic device having a transducer adapted to scan a magnetic record in a spiral track, a prime mover, coupler means operatively coupling the prime mover and said record to rotate said record, a second coupler means operatively coupling said prime mover and said transducer to move the transducer in timed relation with said record, and means to normally operatively disenable said second coupler means and to operatively enable said second coupler means incident to a predetermnied point alignment of said transducer and said record.

13. In a phonographic device having a transducer including a magnetic head adapted to follow a spiral path on a magnetic record, a prime mover, coupler means operatively coupling the prime mover and said record to rotate said record, a second coupler means operatively coupling said prime mover and said transducer to move the magnetic head in timed relation with said record, and means to operatively disenable said second coupler means to prevent movement of the transducer and being actuated incident to a predetermined point alignment of said transducer and said record to operatively enable said second coupler means to establish movement of the transducer, and means to maintain said second coupler means enabled for a cycle of operation in response to initially enabling thereof.

14. In a magnetic disc recorder-reproducer device having a magnetic head adapted to generally radially scan said record, prime moving means, means coupling said prime moving means and said record to rotate the record, holding means to prevent movement of said magnetic head and released incident to a predetermined point alignment of said magnetic head and said record, and coupling means connecting said prime moving means and said magnetic head to move said magnetic head in timed relation with said record when said magnetic head is released, said coupling means allowing movement of said prime mover independently of movement of the magnetic head with said holding means operative.

15. In a phonographic device having a rotatable magnetic disc and a magnetic head adapted to move substantially radially of said disc and in operative transducing relation therewith, a turntable adapted to receive said magnetic disc, cooperating means on said turntable and said magnetic disc to maintain said disc in a predetermined position relative to said turntable, power means to rotate said turntable, coupling means operatively connected to said power means and said magnetic head to move said magnetic head substantially radially of said disc, electrically operated means to operatively disenable said coupling means to prevent movement of the magnetic head, switch means connected to control said electrically operated means to allow movement of the magnetic head, switch actuating means operatively coupled to said turntable and rotated in synchronism therewith, said switch actuating means being positioned relative to said switch means to momentarily actuate said switch means once each cycle of operation, and circuit holding means responsive to actuation of said switch means to maintain operation of said electrically operated means.

16. In a phonographic device having a rotatable magnetic disc and a magnetic head adapted to move substantially radially of said disc and in operative transducing relation therewith, a turntable adapted to receive said magnetic disc, cooperating means on said turntable and said magnetic disc to maintain said disc in a predetermined position relative to said turntable, power means to rotate said turntable, coupling means operatively connected to said power means and said magnetic head to move said magnetic head substantially radially of said disc, said coupling means being of a sliding friction variety whereby said magnetic head is movable independently of said power means, electrically controlled means connected with said magnetic head and moving and holding said head to an initial position incident to a continuous energization of the electrically controlled means, normally closed switch means connected in circuit with said electrically controlled means, means incident to a predetermined alignment of said disc and said magnetic head to open said normally closed switch and release said magnetic head for movement, and latch means responsive to initial opening of said contacts to maintain said contacts open.

17. In a phonographic device having a rotatable magnetic disc record and a magnetic head adapted to move generally radially of said disc and in operative transducing relation therewith, a turntable adapted to receive said magnetic disc, cooperating means on said turntable and said magnetic disc record to maintain said record in a predetermined position relative to said turntable, power means to rotate said turntable, coupling means operatively connected to said power means and said magnetic head to move said magnetic head substantially radially of said disc record, said coupling means being of a sliding friction variety to allow movement of said magnetic head independently of said power means, an electromagnetic device connected to said magnetic head and moving and holding said head to an initial starting position incident to energization of the device, electrically controlled circuit controlling means having a first normal position to maintain said electromagnetic device energized and a second actuated position to effect de-energization of said device, a first normally open switch closed once each revolution of the turntable, a second normally open switch held closed incident to the positioning of the magnetic head in starting position, said electrically controlled device and said first and second normally open switches being serially connected in a power circuit to move said electrically controlled device to said second actuated position and thereby de-energize said electromagnetic device to release said magnetic head, and latch means to maintain said electrically controlled device in said second position.

18. In a phonographic device having an electrical power circuit and having a recording means to record a message on a record and a reproducing means to reproduce a previously recorded message, a tone arm adapted to carry said recording means and said reproducing means, a switch shaft journaled in a stationary bearing having a threaded lateral opening in one wall portion, a switch mounted on said shaft for rotation thereabout and having an actuating element biased to an initial position, a follower member coupled to said tone arm and moved in synchronism therewith and disposed to engaged the actuating element of said switch to pivot the switch within the bearing, and a manually actual movable set screw adapted to be threaded through said threaded lateral opening and into engagement with said switch shaft to lock said switch in position against rotation to effect actuation of the switch, the bias of said actuating element preventing actuation of the switch with the switch in a released position and allowing movement of the actuating element from said initial position to a switch actuating position under the action of relative movement of said follower member with the switch in a locked position.

19. In telephone answering apparatus employing a magnetic disc record carrying an outgoing message in a generally spiral path and a magnetic transducer to record and to subsequently translate said message in response to incoming ringing current, means normally maintaining said transducer stationary, means responsive to predetermined point alignment of said transducer and said record to disenable said last named means and thereby to release said transducer, reset means to reset said transducer to starting position, switch means to control said reset means and being biased to an initial position and operably associated with said transducer to proportionally move from the initial position with said transducer during a recording cycle, and means to releasably lock said switch in position to automatically reset said transducer to starting position at the end of a reproduction of the message.

20. In telephone answering apparatus having a turntable to support a magnetic disc record carrying an outgoing message in a generally spiral path and a cyclically movable magnetic transducer to record said message and to subsequently translate said message in response to an incoming ringing signal and having drive means to rotate said turntable, means operably coupling said transducer to said drive means for simultaneous movement of said record and said transducer, electrical means to operably disenable said last named means, switch means connected in a control circuit with said electircal means and responsive to a predetermined relative positioning of said turntable and said transducer to enable said coupling to move to said transducer, switch means requiring a predetermined switch actuating pressure and adapted to reset said transducer to original standby position, movable support means to movably support said switch means, lock means disposed to engage the support means and hold the support means against movement, and switch actuating means disposed to engage said switch means and operably associated with the transducer to position said switch means in accordance with the movement of the transducer with said last named means released during a recording of a message and to actuate said switch means with said lock means in a locking position at the end of a reproducing cycle.

21. In telephone answering apparatus having a turntable to support a magnetic disc record carrying an outgoing message in a generally spiral path and a cyclically movable magnetic transducer to record said message and to subsequently translate said message in response to an incoming ringing signal and having drive means to rotate said turntable, motor means operably coupled with said transducer to move said transducer relative to said record, switch means responsive to a predetermined positioning of said transducer and said turntable to complete the energizing circuit for said motor means, and means biasing said transducer to an original starting position, switch means requiring a predetermined switch actuating pressure and adapted to reset said telephone answering apparatus to original standby position, movable support means to movably support said switch means, lock means disposed to engage the support means and hold the support means against movement, and switch actuating means disposed to engage said switch means and operably associated with the transducer to position said switch means in accordance with the movement of the transducer with said last named means released during a recording of a message and to actuate said switch means at the end of a reproducing cycle with said lock means disposed in a locking position.

22. In telephone answering apparatus employing a rotating record member carrying an outgoing message and a transducing means adapted to scan the rotating record member and reproduce said message, means responsive to incoming ringing signals to move said record member, means to prevent movement of said transducing means and wtihout interference with movement of the record member, and means responsive to a predetermined radial and circumferential positioning of said transducing means with respect to said record member to release said transducing means and latch said apparatus into a cycle of operation.

References Cited in the file of this patent

UNITED STATES PATENTS

| | | |
|---|---|---|
| 2,519,568 | Handschin | Aug. 22, 1950 |
| 2,756,057 | Parkinson | July 24, 1952 |
| 2,680,150 | Weld | June 1, 1954 |
| 2,724,016 | Deventer | Nov. 15, 1955 |
| 2,732,144 | Jones | Jan. 24, 1956 |
| 2,761,899 | Keith et al. | Sept. 4, 1956 |
| 2,800,531 | Kobler | July 23, 1957 |
| 2,816,167 | Muller | Dec. 10, 1957 |
| 2,835,737 | Shively | May 20, 1958 |
| 2,880,279 | Nickerson | Mar. 31, 1959 |
| 2,883,476 | Dermond et al. | Apr. 21, 1959 |
| 2,934,609 | Peterson | Apr. 26, 1960 |

UNITED STATES PATENT OFFICE

CERTIFICATE OF CORRECTION

Patent No. 3,047,663 July 31, 1962

Joseph J. Zimmermann

It is hereby certified that error appears in the above numbered patent requiring correction and that the said Letters Patent should read as corrected below.

Column 14, line 8, for "photographic" read -- phonographic --.

Signed and sealed this 20th day of November 1962.

(SEAL)

Attest:

ERNEST W. SWIDER
Attesting Officer

DAVID L. LADD
Commissioner of Patents